J. SEDGBEER.

Millstone Dress.

No. 4,135. Reissued Sept. 27, 1870.

Witnesses.
Chas. Kenyon
Edwd. P. Mace.

Inventor.
Joseph Sedgbeer
Chipman & Osmun & Co
Attorneys

N. PETERS, Photo-Lithographer, Washington, D. C.

United States Patent Office.

JOSEPH SEDGEBEER, OF PAINESVILLE, OHIO

Letters Patent No. 35,858, dated July 8, 1862; reissue No. 4,135, dated September 27, 1870.

IMPROVEMENT IN MILL-STONE DRESS.

The Schedule referred to in these Letters Patent and making part of the same.

*To all whom it may concern:*

Be it known that I, JOSEPH SEDGEBEER, of Painesville, in the county of Lake and State of Ohio, have invented a new and useful Improvement in Dress for Grinding-Mills; and I hereby declare that the following is a full, clear, and exact description of the same, reference being had to the accompanying drawing and letters of reference marked thereon forming a part of this specification.

My invention has relation to the "dress" of mill-stones with cast-iron grinding-surfaces; and It consists in the construction and novel arrangement of the projections or teeth, whereby two important objects are designed to be attained.

First, the teeth are hollowed out centrally, with the object of keeping the flour or meal cool.

Second, the teeth are provided with cutting-edges arranged obliquely to each other and to the radii of the mill-stone, in such a manner as to form radial zigzag channels, designed to serve an efficient purpose in the partial retention of the flour or meal under the superior shear-like grinding action of the oblique cutting-edges.

In the accompanying drawing—

Figure 2 represents a plan view of a portion of the face of the lower plate, the upper one being precisely similar.

Like letters of reference designate like parts throughout the drawing.

The letter A represents the lower grinding-plate.

B designates the upper plate, and *a* the shaft.

C designates the place where the grain is fed into the stones.

Toward the eye of the plates the grinding-surfaces curve upward in a conical form.

Figure 1:
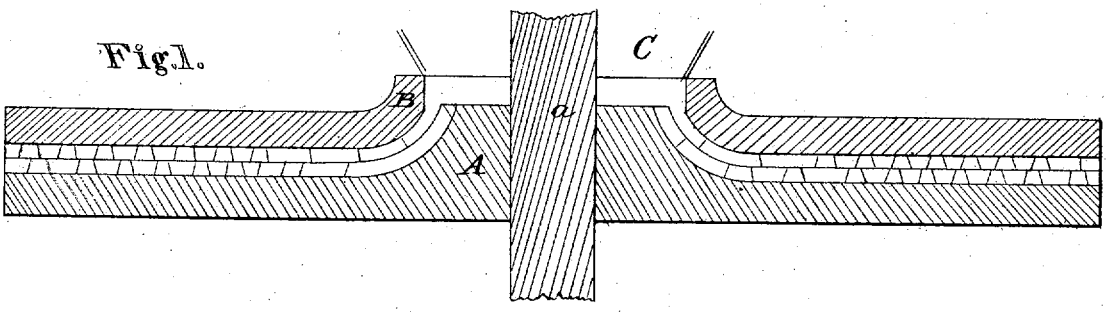
Figure 1 is a vertical central section, showing the lower plate as revolving, and the upper one as stationary.
Figure 2:
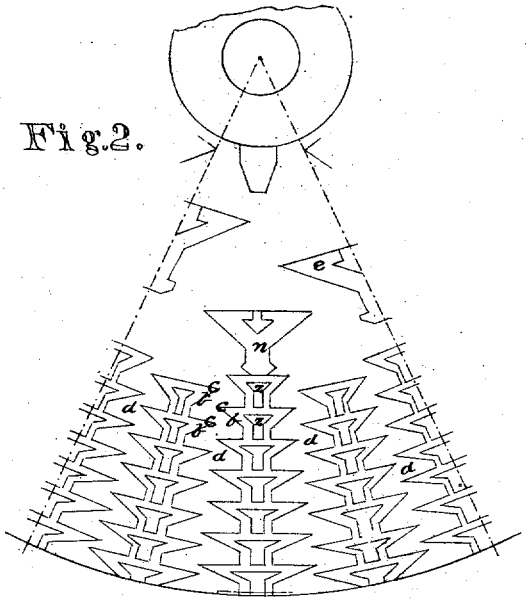

Referring to fig. 2 of the drawing, it will be seen that the teeth of my dress consist of a series of laterally-indented projections, arranged radially around the outer portion of each plate extending from the periphery to about midway of the distance from the periphery to the eye.

These radial teeth are usually indented symmetrically on each side, and between every two indentations an angular point, *c*, extends out laterally, which is provided with cutting-edges *b b*, arranged oblique to the radial lines of the plate.

Each radial indented projection is continuous, and its lateral salient and re-entering angles respectively correspond with those of the adjacent teeth, thus forming continuous zigzag passages *d*, which have an important effect in retaining the flour or meal under the action of the cutting-edges.

Also, the salients and re-entering angles on each side of the radial projections are usually symmetrically arranged in such a manner as to give a succession of broad faces between the salients which are hollowed out, as shown at *z*, and serve as a means of partial communication between the zigzag channels *d*, and to keep the flour or meal cool.

From the termination of these radial indented projections to the eye of the plate, larger teeth are usually arranged in line with every alternate line of indentations, as above described, and separate therefrom, as at *e*, or connected thereto, as at *n*.

These teeth are provided with the same arrangement of oblique cutting-edges above described, and are hollowed out centrally likewise. Their object is to perform the coarser operation of breaking up the grain as it is first fed into the hopper, and they are made strong and large for this purpose. The zigzag channels between them are wider also, to admit of the passage of the coarser particles of the grain broken up in this part of the mill.

The advantages of my dress are—

First, the gradual and effectual manner in which the grain is cut and ground, and worked out toward the periphery, as flour or meal; and Secondly, the means by which the grain is kept cool during the grinding operation.

Having thus described my invention,

What I claim, and desire to secure by Letters Patent, is—

1. In a dress for grinding-plates, radial lines of hollow teeth, having points *c* and cutting-edges *b* oblique to the radii of the plate, and so arranged as to provide continuous radial zigzag channels for the passage of the grain, substantially as specified.

2. In a dress for grinding-plates, the continuous zigzag channels *d*, bounded by cutting-edges *b*, oblique to the radii of the grinding-plate, substantially as specified.

In testimony that I claim the above, I have hereunto subscribed my name in the presence of two witnesses.

Witnesses: JOSEPH SEDGEBEER.

CHARLES KENYON,

D. D. KANE.